US011452162B2

(12) United States Patent
Wang

(10) Patent No.: US 11,452,162 B2
(45) Date of Patent: Sep. 20, 2022

(54) SESSION MANAGEMENT METHOD, MOBILITY MANAGEMENT FUNCTIONAL ENTITY AND SESSION MANAGEMENT FUNCTIONAL ENTITY

(71) Applicant: CHINA ACADEMY OF TELECOMMUNICATIONS TECHNOLOGY, Beijing (CN)

(72) Inventor: Hucheng Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 530 days.

(21) Appl. No.: 16/341,790

(22) PCT Filed: Sep. 8, 2017

(86) PCT No.: PCT/CN2017/100962
§ 371 (c)(1),
(2) Date: Apr. 12, 2019

(87) PCT Pub. No.: WO2018/068598
PCT Pub. Date: Apr. 19, 2018

(65) Prior Publication Data
US 2021/0345441 A1 Nov. 4, 2021

(30) Foreign Application Priority Data
Oct. 14, 2016 (CN) .......................... 201610899113.9

(51) Int. Cl.
*H04W 76/25* (2018.01)
*H04W 4/021* (2018.01)
(Continued)

(52) U.S. Cl.
CPC ........... *H04W 76/25* (2018.02); *H04W 4/021* (2013.01); *H04W 4/027* (2013.01); *H04W 8/08* (2013.01);
(Continued)

(58) Field of Classification Search
CPC ..... H04W 76/25; H04W 4/021; H04W 4/027; H04W 8/08; H04W 36/0016; H04W 36/08; H04W 36/32
(Continued)

(56) References Cited

U.S. PATENT DOCUMENTS

2012/0209978 A1* 8/2012 Cho ...................... H04W 60/04
709/223
2013/0308527 A1 11/2013 Chin et al.
2016/0105928 A1* 4/2016 Xu ...................... H04W 72/048
370/329

FOREIGN PATENT DOCUMENTS

CN 102448144 A 5/2012
CN 102457938 A 5/2012
(Continued)

OTHER PUBLICATIONS

First Office Action and Search Report from CN app. No. 201610899113.9, dated Dec. 13, 2019, with English translation from Global Dossier.
Second Office Action and Supplementary Search Report from CN app. No. 201610899113.9, dated May 14, 2019, with English translation from Global Dossier.
(Continued)

*Primary Examiner* — Joel Ajayi
(74) *Attorney, Agent, or Firm* — Ladas & Parry, LLP

(57) ABSTRACT

The present disclosure provides a session management method, a mobility management functional entity and a session management functional entity. The session management method includes: judging, by a mobility management functional entity, whether a UE has moved out of an allowed area; when the UE has moved out of the allowed area, determining, by the mobility management functional entity, a management message for a session of the UE; and transmitting, by the mobility management functional entity, the management message to a session management functional entity for serving the UE. The management message is adopted to trigger the session management functional entity to manage the session of the UE.

19 Claims, 12 Drawing Sheets

(51) Int. Cl.
*H04W 4/02* (2018.01)
*H04W 8/08* (2009.01)
*H04W 36/00* (2009.01)
*H04W 36/08* (2009.01)
*H04W 36/32* (2009.01)

(52) U.S. Cl.
CPC ....... *H04W 36/0016* (2013.01); *H04W 36/08* (2013.01); *H04W 36/32* (2013.01)

(58) Field of Classification Search
USPC .......................................................... 455/440
See application file for complete search history.

(56) References Cited

FOREIGN PATENT DOCUMENTS

| | | |
|---|---|---|
| CN | 102625396 A | 8/2012 |
| CN | 102647762 A | 8/2012 |
| CN | 103379578 A | 10/2013 |
| CN | 104349286 A | 2/2015 |

OTHER PUBLICATIONS

Extended European Search Report from EP 17860126.6, dated Jul. 9, 2019.
Written Opinion of the International Searching Authority from PCT/CN2017/100962, dated Oct. 27, 2017, with English translation from WIPO.
International Preliminary Report on Patentability from PCT/CN2017/100962, dated Apr. 16, 2019, with English translation from WIPO.
"Update to the interaction between MM and SM", S2-165115, SA WG2 Meeting #116bis, Sanya, China, Aug. 29-Sep. 2, 2016.
"Further clarifications on MM and SM relationship in solution 4.17", S2-165116, SA WG2 Meeting #116-BIS, Sanya, China, Aug. 29-Sep. 2, 2016.
"$3^{RD}$ Generation Partnership Project; Technical Specification Group Services and System Aspects; Study on Architecture for Next Generation System (Release 14)", 3GPP TR 23.799, V1.0.2, Sep. 2016.
International Search Report for PCT/CN2017/100962 dated Oct. 27, 2017 and its English translation provided by WIPO.
Written Opinion of the International Searching Authority for PCT/CN2017/100962 dated Oct. 27, 2017 and its English translation provided by Google Translate.

* cited by examiner

SESSION MANAGEMENT METHOD, MOBILITY MANAGEMENT FUNCTIONAL ENTITY AND SESSION MANAGEMENT FUNCTIONAL ENTITY

CROSS-REFERENCE TO RELATED APPLICATIONS

This application is the U.S. national phase of PCT Application No. PCT/CN2017/100962 filed on Sep. 8, 2017, which claims priority to Chinese Patent Application No. 201610899113.9 filed on Oct. 14, 2016, the disclosures of which are incorporated in their entireties by reference herein.

TECHNICAL FIELD

The present disclosure relates to the field of communication technology, in particular to a session management method, a mobility management functional entity and a session management functional entity.

BACKGROUND

A mobile communication network is required to support more network applications in future, so as to meet service requirements in various scenarios and meet requirements on service performance of different User Equipments (UEs). In order to improve the utilization of network resources, on-demand mobility management has been proposed for the mobile communication network in the future, in which different mobility supports can be provided based upon different characteristics of the UEs and services.

The on-demand mobility management has defined different mobility levels, e.g., no mobility, limited/low mobility, and unlimited mobility. For the limited/low mobility, it is required to provide the UE with a geographic area within which the UE is allowed to move, so that the UE is merely capable of acquiring the services in this area. When the UE has moved out of the area, the UE is incapable of communicating with a network, and initiating any other request other than a position update request. The network may probably reject this request or update the mobility level for the UE. When the UE has moved out of the allowed area and the mobility level for the UE has been updated, unnecessary issuing of data and a waste of connection resources may be caused if a session is not deleted or updated. However, it is impossible for a current mobile communication network to manage the session in an effective manner.

SUMMARY

An object of the present disclosure is to provide a session management method, a mobility management functional entity and a session management functional entity, so as to manage the session in an effective manner.

In one aspect, the present disclosure provides in some embodiments a session management method, including: judging, by a mobility management functional entity, whether a UE has moved out of an allowed area; when the UE has moved out of the allowed area, determining, by the mobility management functional entity, a management message for a session of the UE; and transmitting, by the mobility management functional entity, the management message to a session management functional entity for serving the UE. The management message is adopted to trigger the session management functional entity to manage the session of the UE.

In a possible embodiment of the present disclosure, the determining, by the mobility management functional entity, the management message for the session of the UE includes: judging, by the mobility management functional entity, whether the UE is capable of acquiring a network service continuously; and when the UE is incapable of acquiring the network service continuously, determining, by the mobility management functional entity, a management message for deleting the entire session of the UE or a user plane of the session.

In a possible embodiment of the present disclosure, the transmitting, by the mobility management functional entity, the management message to the session management functional entity for serving the UE includes: starting a timer by the mobility management functional entity; and transmitting, by the mobility management functional entity, the management message to the session management functional entity for serving the UE after the timer is timed out.

In a possible embodiment of the present disclosure, prior to starting the timer by the mobility management functional entity, the session management method further includes: acquiring, by the mobility management functional entity, mobility information of the UE; and judging, by the mobility management functional entity, whether it is possible for the UE to move back to the allowed area in accordance with the mobility information of the UE. The step of starting the timer by the mobility management functional entity includes, when it is possible for the UE to move back to the allowed area, starting the timer by the mobility management functional entity.

In a possible embodiment of the present disclosure, subsequent to determining, by the mobility management functional entity, whether the UE is capable of acquiring the network service continuously, the session management method further includes: when the UE is capable of acquiring the network service continuously, updating, by the mobility management functional entity, a mobility level for the UE; and/or determining, by the mobility management functional entity, a management message for updating the session of the UE. The management message for updating the session of the UE is adopted to trigger the session management functional entity to update a user plane transmission path for the session.

In a possible embodiment of the present disclosure, subsequent to judging, by the mobility management functional entity, whether the UE is capable of acquiring the network service continuously, the session management method further includes: when the UE is capable of acquiring the network service continuously, receiving, by the mobility management functional entity, a switching request transmitted from an access network node for switching the session to a target access network node; and determining, by the mobility management functional entity, a management message for switching the session to the target access network node.

In a possible embodiment of the present disclosure, subsequent to transmitting, by the mobility management functional entity, the management message to the session management functional entity for serving the UE, the session management method further includes: receiving, by the mobility management functional entity, management confirmation information transmitted from the session management functional entity; and transmitting, by the mobility management functional entity, feedback information to the UE in accordance with the management confirmation information.

In a possible embodiment of the present disclosure, the network service includes a session connection between the UE and a network.

In a possible embodiment of the present disclosure, the mobility management functional entity and the session management functional entity are arranged in a same control plane management functional entity.

In a possible embodiment of the present disclosure, the judging, by the mobility management functional entity, whether the UE has moved out of the allowed area includes: judging, by the mobility management functional entity, whether the UE has moved out of the allowed area in accordance with a position report about the UE or information reported by a base station.

In another aspect, the present disclosure provides in some embodiments a session management method, including: receiving, by a session management functional entity for serving a UE, a management message transmitted from a mobility management functional entity; and managing, by the session management functional entity, a session of the UE in accordance with the management message.

In a possible embodiment of the present disclosure, the management message transmitted from the mobility management functional entity includes at least one of a management message for deleting the entire session of the UE or a user plane of the session, a management message for updating the session of the UE, or a management message for switching the session of the UE to a target access network node.

In a possible embodiment of the present disclosure, the managing, by the session management functional entity, the session of the UE in accordance with the management message includes updating, by the session management functional entity, a user plane transmission path for the session in accordance with the management message for updating the session of the UE.

In a possible embodiment of the present disclosure, the updating, by the session management functional entity, the user plane transmission path for the session in accordance with the management message for updating the session of the UE includes updating, by the session management functional entity, the user plane transmission path for the session in accordance with the management message for updating the session of the UE and an Access Point Name (APN) of a Protocol Data Unit (PDU).

In a possible embodiment of the present disclosure, the managing, by the session management functional entity, the session of the UE in accordance with the management message includes: switching, by the session management functional entity, the user plane transmission path for the session to the target access network node in accordance with the management message for switching the session of the UE to the target access network node.

In a possible embodiment of the present disclosure, the managing, by the session management functional entity, the session of the UE in accordance with the management message includes: starting a timer by the session management functional entity; and managing, by the session management functional entity, the session of the UE in accordance with the management message after the timer is timed out.

In a possible embodiment of the present disclosure, prior to starting the timer by the session management functional entity, the session management method further includes judging, by the session management functional entity, whether it is necessary to start the timer in accordance with an APN of the session. The step of starting the timer by the session management functional entity includes, when it is determined by the session management functional entity, starting the timer by the session management functional entity.

In a possible embodiment of the present disclosure, subsequent to managing, by the session management functional entity, the session of the UE in accordance with the management message, the session management method further includes: transmitting, by the session management functional entity, management confirmation information to the mobility management functional entity.

In a possible embodiment of the present disclosure, the session management functional entity and the mobility management functional entity are arranged in a same control plane management functional entity.

In yet another aspect, the present disclosure provides in some embodiments a mobile management functional entity, including: a judgment module configured to judge whether a UE has moved out of an allowed area; a determination module configured to, when the UE has moved out of the allowed area, determine a management message for a session of the UE; and a transmission module configured to transmit the management message to a session management functional entity for serving the UE. The management message is adopted to trigger the session management functional entity to manage the session of the UE.

In a possible embodiment of the present disclosure, the determination module includes: a first judgment unit configured to judge whether the UE is capable of acquiring a network service continuously; and a first determination unit configured to, when the UE is incapable of acquiring the network service continuously, determine a management message for deleting the entire session of the UE or a user plane of the session.

In a possible embodiment of the present disclosure, the transmission module includes: a start unit configured to start a timer; and a transmission unit configured to transmit the management message to the session management functional entity for serving the UE after the timer is timed out.

In a possible embodiment of the present disclosure, the transmission module further includes: an acquisition unit configured to acquire mobility information of the UE; and a judgement unit configured to judge whether it is possible for the UE to move back to the allowed area in accordance with the mobility information of the UE. The start unit is further configured to, when it is possible for the UE to move back to the allowed area, start the timer.

In a possible embodiment of the present disclosure, the determination module further includes: an updating unit configured to, when the UE is capable of acquiring the network service continuously, update a mobility level for the UE; and/or a second determination unit configured to determine a management message for updating the session of the UE. The management message for updating the session of the UE is adopted to trigger the session management functional entity to update a user plane transmission path for the session.

In a possible embodiment of the present disclosure, the determination module further includes: a reception unit configured to, when the UE is capable of acquiring the network service continuously, receive a switching request transmitted from an access network node for switching the session to a target access network node; and a third determination unit configured to determine a management message for switching the session to the target access network node.

In a possible embodiment of the present disclosure, the mobility management functional entity further includes: a reception module configured to receive management confirmation information transmitted from the session management functional entity; and a feedback module configured to transmit feedback information to the UE in accordance with the management confirmation information.

In a possible embodiment of the present disclosure, the network service includes a session connection between the UE and a network.

In a possible embodiment of the present disclosure, the mobility management functional entity and the session management functional entity are arranged in a same control plane management functional entity.

In a possible embodiment of the present disclosure, the judgment module is further configured to judge whether the UE has moved out of the allowed area in accordance with a position report about the UE or information reported by a base station.

In still another aspect, the present disclosure provides in some embodiments a session management functional entity, including: a reception module configured to receive a management message transmitted from a mobility management functional entity; and a management module configured to manage a session of the UE in accordance with the management message.

In a possible embodiment of the present disclosure, the management message transmitted from the mobility management functional entity includes one or more of a management message for deleting the entire session of the UE or a user plane of the session, a management message for updating the session of the UE, and a management message for switching the session of the UE to a target access network node.

In a possible embodiment of the present disclosure, the management module is further configured to update a user plane transmission path for the session in accordance with the management message for updating the session of the UE.

In a possible embodiment of the present disclosure, the management module is further configured to update the user plane transmission path for the session in accordance with the management message for updating the session of the UE and an APN of a PDU.

In a possible embodiment of the present disclosure, the management module is further configured to switch the user plane transmission path for the session to the target access network node in accordance with the management message for switching the session of the UE to the target access network node.

In a possible embodiment of the present disclosure, the management module includes: a start unit configured to start a timer; and a management unit configured to manage the session of the UE in accordance with the management message after the timer is timed out.

In a possible embodiment of the present disclosure, the management module further includes a judgment unit configured to judge whether it is necessary to start the timer in accordance with an APN of the session. The start unit is further configured to, when it is determined by the session management functional entity, start the timer by the session management functional entity.

In a possible embodiment of the present disclosure, the session management functional entity further includes a transmission module configured to transmit management confirmation information to the mobility management functional entity.

In a possible embodiment of the present disclosure, the session management functional entity and the mobility management functional entity are arranged in a same control plane management functional entity.

In still another aspect, the present disclosure provides in some embodiments a mobility management functional entity, including a processor, a memory and a transceiver. The processor is configured to read and execute a program stored in the memory, so as to: judge whether a UE has moved out of an allowed area; when the UE has moved out of the allowed area, determine a management message for a session of the UE; and transmit through the transceiver the management message to a session management functional entity for serving the UE. The management message is adopted to trigger the session management functional entity to manage the session of the UE. The transceiver is configured to receive and transmit data, and the memory is configured to store therein data for the operation of the processor.

In still another aspect, the present disclosure provides in some embodiments a session management functional entity, including a processor, a memory and a transceiver. The processor is configured to read and execute a program stored in the memory, so as to: receive through the transceiver a management message transmitted from a mobility management functional entity; and manage a session of the UE in accordance with the management message. The transceiver is configured to receive and transmit data, and the memory is configured to store therein data for the operation of the processor.

According to the embodiments of the present disclosure, the mobility management functional entity judges whether the UE has moved out of the allowed area, determines the management message for the session of the UE when the UE has moved out of the allowed area, and transmits the management message to the session management functional entity for serving the UE. The management message is adopted to trigger the session management functional entity to manage the session of the UE. As a result, it is able to delete, switch or update the session of the UE in time when the UE has moved out of the allowed area, and prevent the date from being issued unnecessarily, thereby to reduce the waste of connection resources.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

As described in the $3^{rd}$ Generation Partnership Project (3GPP), a new-generation mobile communication system (e.g., a $5^{th}$-Generation (5G) mobile communication system) needs to provide mobility supports for different requirements. There are different communication scenarios in the 5G network. Different UEs may have different mobile paradigms, e.g., some UEs may access to the network at a high speed, while some UEs may access to the network nomadically or statically. Different services also require various mobility supports, e.g., some services prefer to reduce an interruption rate and a packet loss rate during the transmission, therefore the network may be required to mask any mobility event for an application layer (including maintaining an Internet Protocol (IP) address unchanged during a switching process); while for the other services, service continuity may be guaranteed by technical means of the application layer. Based on the above considerations, on-demand mobility management has been proposed by the 3GPP, i.e., different mobility supports may be provided on the basis of the individual characteristics of the UEs and the services.

Figure 1:
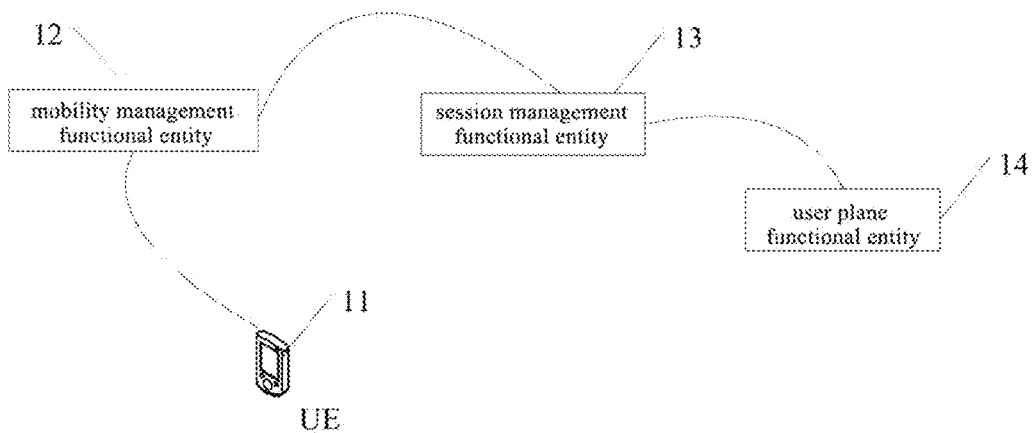
FIG. 1 is a schematic view showing an application scenario in which a session management method is applied according to one embodiment of the present disclosure.

As shown in FIG. 1 which is a schematic view showing a network, the network includes a UE 11, a mobility management (MM) functional entity 12, a session management (SM) functional entity 13, and a user plane (UP) functional entity 14. The UE 11 may be a terminal device such as mobile phone, computer, household appliance, tablet personal computer, laptop computer, personal digital assistant (PDA), mobile Internet device (MID) or wearable device. It should be appreciated that, a type of the UE 11 will not be particularly defined herein.

The mobility management functional entity 12, the session management functional entity 13 and the user plane functional entity 14 may each be a network functional entity located in a one network entity, or a network functional entity distributed in a plurality of network entities (i.e., a common functional entity shared by the plurality of network entities). Each network functional entity may be a 3GPP-adopted or 3GPP-defined processing functional entity in a network, which has defined functional behavior and 3GPP-defined interfaces. The mobility management functional entity 12 and the session management functional entity 13 may each be a network functional entity located in a control plane of a core network, and the user plane functional entity 14 may be a network functional entity located in a user plane. It should be appreciated that, the network may not include the user plane functional entity 14, that is, including merely the UE 11, the mobility management functional entity 12 and the session management functional entity 13. The mobility management functional entity 12 and the session management functional entity 13 may be located in different control plane management functional entities, or in a same control plane management functional entity, which will not be particularly limited herein.

Figure 2:
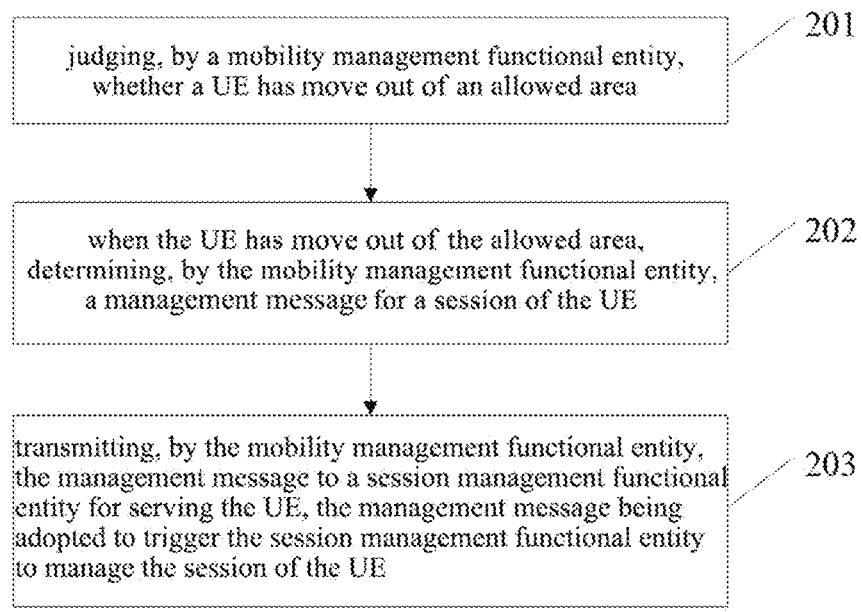
FIG. 2 is a schematic flow chart of the session management method according to one embodiment of the present disclosure.

The present disclosure provides in some embodiments a session management method which, as shown in FIG. 2, includes: Step 201 of judging, by a mobility management functional entity, whether a UE has moved out of an allowed area; Step 202 of, when the UE has moved out of the allowed area, determining, by the mobility management functional entity, a management message for a session of the UE; and Step 203 of transmitting, by the mobility management functional entity, the management message to a session management functional entity for serving the UE. The management message is adopted to trigger the session management functional entity to manage the session of the UE.

The allowed area may be an area in which the UE is allowed to acquire a network service. When the UE has moved out of the allowed area, the UE is incapable of acquiring certain network services, nor initiating any request other than a position update request. The network may probably reject the request or update a mobility level for the UE. The mobility management functional entity may configure the allowed area for the UE in advance, acquire a geographic area where the UE is located, and then judge whether the UE has moved out of the allowed area. The mobility management functional entity may judge whether the UE has moved out of the allowed area in accordance with a position report from the UE, or information reported by a base station to which the UE is connected.

When the UE has moved out of the allowed area, the mobility management functional entity may determine the management message for the session of the UE. The session may be a PDU session or a PDU connection. The mobility management functional entity may determine the management message for the session of the UE in accordance with whether the UE is capable of continuously acquiring the network service after the UE has moved out of the allowed area. The management message for the session of the UE may be a management message for deleting the session of the UE, a management message for updating a PDU of the UE, or a management message for switching the session of the UE to a target access network node. The determining, by the mobility management functional entity, the management message for the session of the UE may include determining the management message for all or parts of the sessions of the UE.

After determining the management message for the session of the UE, the mobility management functional entity may transmit the management message to the session management functional entity for serving the UE. The management message may be adopted to trigger the session management functional entity to manage the session of the UE. To be specific, after determining the management message for the session of the UE, the mobility management functional entity may determine the session management functional entity for serving the UE, and then transmit the management message to the determined session management functional entity. Upon the receipt of the management message, the session management functional entity may manage the session of the UE in accordance with the management message. For example, when the management message is a management message for deleting the session of the UE, the session management functional entity may delete the session of the UE. Likewise, when the management message is a management message for updating the session of the UE, the session management functional entity may update the session of the UE. And when the management message is a management message for switching the session of the UE to a target access network node, the session management functional entity may switch the session of the UE to the target access network node.

In a possible embodiment of the present disclosure, the determining, by the mobility management functional entity, the management message for the session of the UE includes: judging, by the mobility management functional entity, whether the UE is capable of acquiring a network service continuously; and when the UE is incapable of acquiring the network service continuously, determining, by the mobility management functional entity, the management message for deleting the session of the UE.

In the embodiments of the present disclosure, the mobility management functional entity may judge whether the UE is capable of acquiring the network service continuously in accordance with a type of the UE, access information and the like. When the UE has moved out of the allowed area, the UE is incapable of acquiring the network service continuously, and the mobility management functional entity may determine the management message for deleting the session of the UE.

Figure 3:
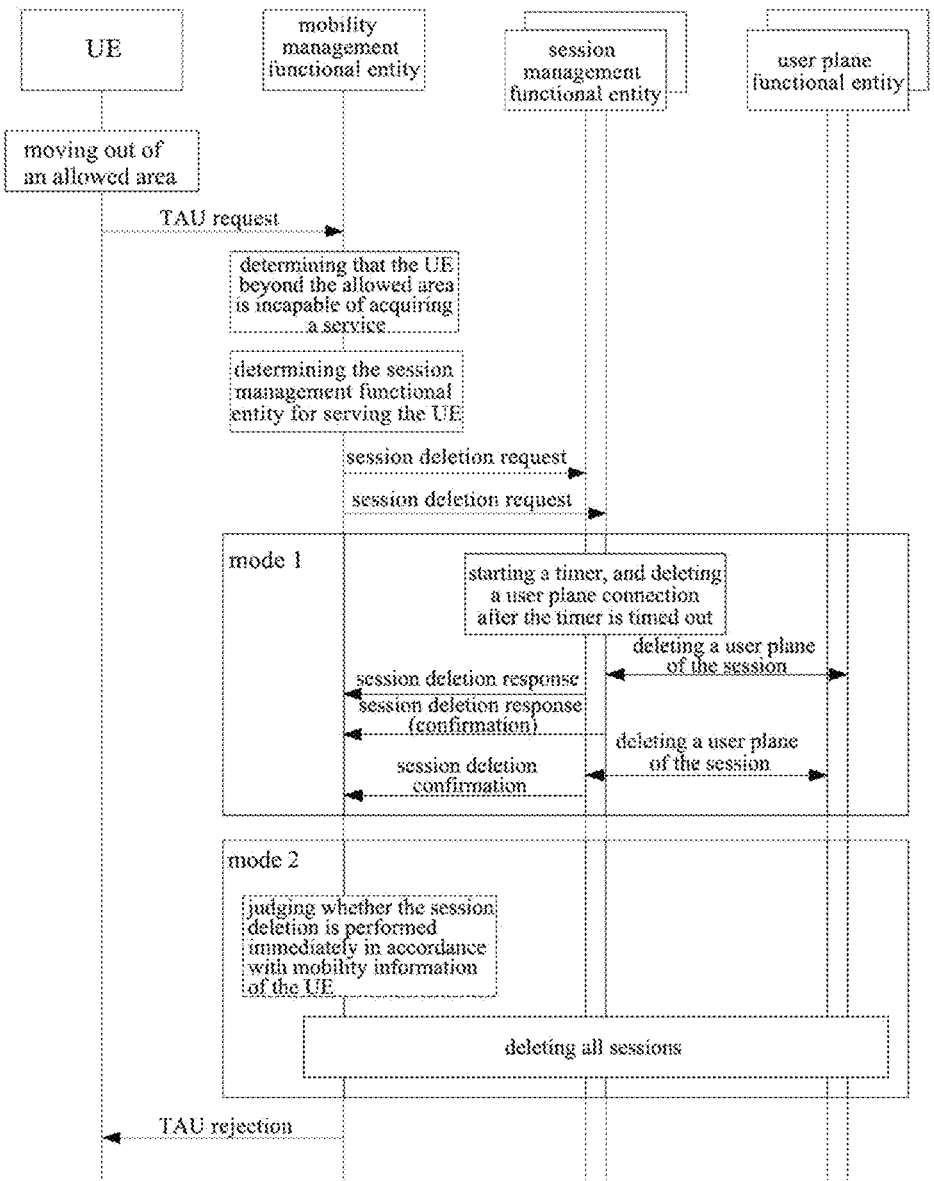
FIG. 3 is an illustrative schematic view showing the session management method according to one embodiment of the present disclosure.

As shown in FIG. 3, which is an illustrative schematic view showing the session management method according to one embodiment of the present disclosure, after the UE has moved out of the allowed area, it may initiate a Tracking Area Update (TAU) request to the mobility management functional entity. Upon receipt of the TAU request transmitted from the UE, the mobility management functional entity may determine that the UE has currently moved out of the allowed area, and further judge whether the UE located beyond the allowed area is capable of acquiring the network service continuously. In the embodiments of the present disclosure, the mobility management functional entity may judge whether the UE located beyond the allowed area is capable of acquiring the network service continuously in accordance with the type of the UE, the access information and so on.

The illustration of FIG. 3 is provided for a case where the mobility management functional entity determines that the UE located beyond the allowed area is incapable of acquiring the network service continuously. As shown in FIG. 3, the mobility management functional entity may determine that the UE located beyond the allowed area is incapable of acquiring the network service continuously, and then determine the management message for deleting all the sessions of the UE. Then, the mobility management functional entity may determine the session management functional entity for serving the UE, and transmit the management message for deleting the sessions of the UE (i.e., a session deletion request in FIG. 3) to the session management functional entity for serving the UE.

In the embodiments of the present disclosure, the mobility management functional entity may transmit the session deletion request to the session management functional entity immediately. For example, as shown in FIG. 3, in mode 1, the mobility management functional entity may transmit the session deletion request to the session management functional entity immediately after the determination of the session management functional entity for serving the UE. Upon the receipt of the session deletion request, the session management functional entity may instruct the user plane functional entity to delete all the user planes of the session for the UE. In some embodiments of the present disclosure, upon the receipt of the session deletion request, the session management functional entity may transmit a session deletion response to the mobility management functional entity (e.g., notify the mobility management functional entity that the session is about to be deleted), and instruct the user plane functional entity to delete all the user planes of the session for the UE. Upon receipt of deletion confirmation information form the user plane functional entity, the session management functional entity may transmit a session user plane deletion confirmation message to the mobility management functional entity, so as to notify the mobility management functional entity that the session has been deleted. In some other embodiments of the present disclosure, upon the receipt of the session deletion request, the session management functional entity may directly instruct the user plane functional entity to delete the user plane of the session. After determining that the user plane functional entity has deleted the user plane of the session, the session management functional entity may transmit a session deletion confirmation response to the mobility management functional entity. In other words, in the embodiments of the present disclosure, the session management functional entity may not transmit a session deletion response to the mobility management functional entity before the user plane of the session has been deleted, but directly transmit the session deletion confirmation response to the mobility management functional entity after the user plane of the session has been deleted.

In a possible embodiment of the present disclosure, the transmitting, by the mobility management functional entity, the management message to the session management functional entity for serving the UE includes: starting a timer by the mobility management functional entity; and transmitting, by the mobility management functional entity, the management message to the session management functional entity for serving the UE after the timer is timed out.

In the embodiments of the present disclosure, the mobility management functional entity may also start the timer (e.g., a periodic TAU timer), and after the timer is timed out, transmit the session deletion request to the session management functional entity (i.e., suspend the session). The mobility management functional entity may directly start the timer, or judge whether to directly start the timer in accordance with position information and/or access information of the UE. During the operation period of the timer, downlink data for each session may be discarded, or buffered in the user plane functional entity.

In a possible embodiment of the present disclosure, prior to starting the timer by the mobility management functional entity the session management method may further include: acquiring, by the mobility management functional entity, mobility information of the UE; and judging, by the mobility management functional entity, whether it is possible for the UE to move back to the allowed area in accordance with the mobility information of the UE. The starting the timer by the mobility management functional entity may include, when it is possible for the UE to move back to the allowed area, starting the timer by the mobility management functional entity.

As shown in FIG. 3, in mode 2, the mobility management functional entity may acquire the mobility information of the UE and judge whether to start the timer in accordance with the mobility information. To be specific, the mobility management functional entity may judge whether it is possible for the UE to move back to the allowed are in accordance with the mobility information of the UE (e.g., a movement regulation of the UE), and when it is possible for the UE to move back to the allowed area, start the timer. If the UE does not move back to the allowed area after the timer is timed out, the mobility management functional entity may transmit the management message for deleting the session. If the UE moves back to the allowed area before the timer is timed out, the mobility management functional entity may monitor whether there is still a session management functional entity for serving the UE currently. If there is still a session management functional entity for serving the UE currently, the mobility management functional entity may request the restoration of the session on the session management functional entity.

It should be appreciated that, in the embodiments of the present disclosure, the mobility management functional entity and the session management functional entity may both start the timers, or may not start any timer, or one of them may start the timer, which will not be particularly limited herein. The session management functional entity may determine whether to start the timer in accordance with session information (e.g., an APN).

In a possible embodiment of the present disclosure, subsequent to determining, by the mobility management functional entity, whether the UE is capable of acquiring the network service continuously, the session management method further includes: updating, by the mobility management functional entity, a mobility level for the UE when the UE is capable of acquiring the network service continuously; and/or determining, by the mobility management functional entity, a management message for updating the session of the UE. The management message for updating the session of the UE is adopted to trigger the session management functional entity to update a user plane transmission path for the session.

Figure 4:
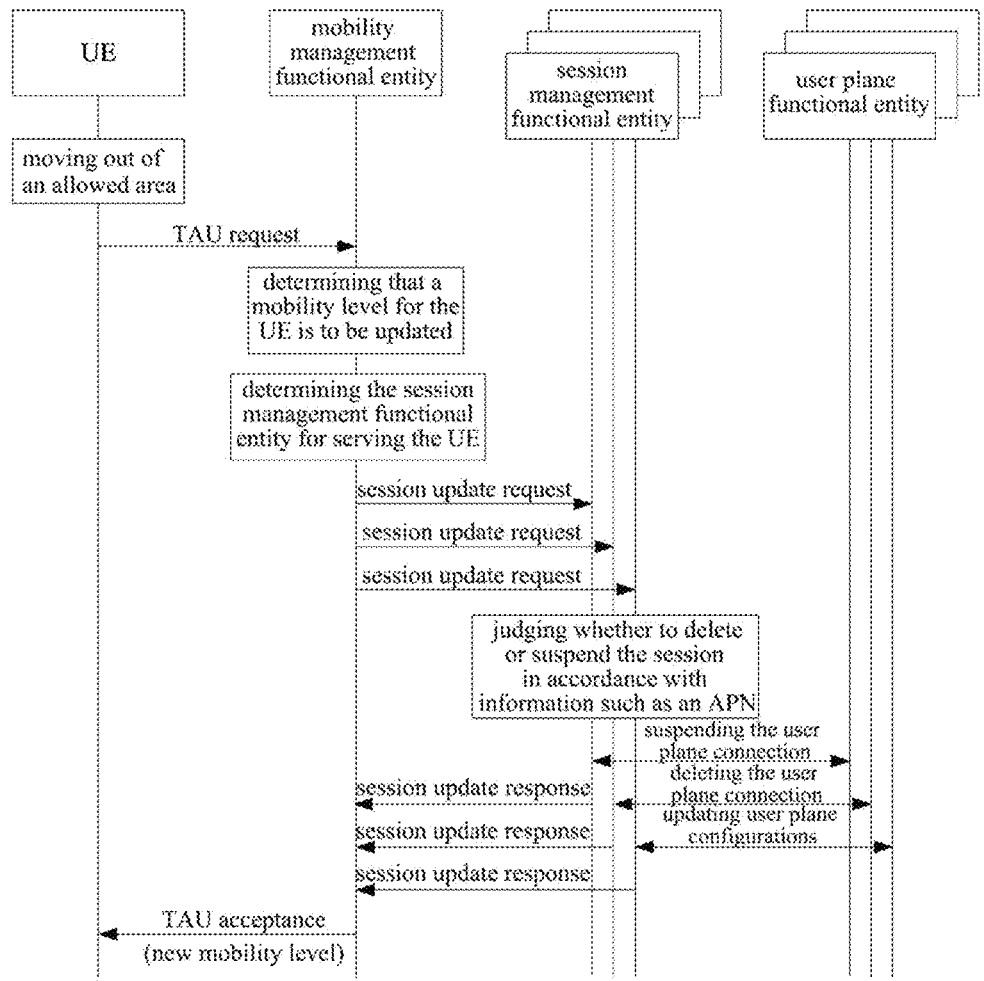
FIG. 4 is another illustrative schematic view showing the session management method according to one embodiment of the present disclosure.

In another example, as shown in FIG. 4, which is another illustrative schematic view showing the session management method according to one embodiment of the present disclosure, upon the receipt of the TAU request transmitted from the UE, the mobility management functional entity may update the mobility level for the UE. It should be appreciated that, when there is currently no session for the UE, the mobility management functional entity only need to update the mobility level for the UE. The updating the mobility level for the UE may include updating an area where the UE is currently located into an area in which the UE is allowed to acquire the network service, i.e., updating the area where the UE is currently located into the allowed area. When there is the session for the UE, the mobility management functional entity may, after updating the mobility level for the UE, determine the management message for updating the session of the UE, and initiate a session update request (i.e., a session update request in FIG. 4) to the session management functional entity for serving the UE. Upon the receipt of the session update request, the session management functional entity may update the user plane transmission path for the session. After updating the user plane transmission path for the session, the session management functional entity may transmit a session update response to the mobility management functional entity, so as to notify the mobility management functional entity that the session has been updated.

The updating, by the session management functional entity, the user plane transmission path for the session may include one or more of: requesting the user plane functional entity to delete the session; requesting the user plane functional entity to suspend the session (i.e., starting the timer and deleting the session after the timer is timed out), and re-selecting a user plane functional entity for the session. The session management functional entity may determine a user plane updating operation for the session in accordance with the session information (e.g., the APN).

In a possible embodiment of the present disclosure, subsequent to judging, by the mobility management functional entity, whether the UE is capable of acquiring the network service continuously, the session management method may further include: when the UE is capable of acquiring the network service continuously, receiving, by the mobility management functional entity, a switching request transmitted from an access network node for switching the session to a target access network node; and switching, by the mobility management functional entity, the session to the target access network node.

Figure 5:
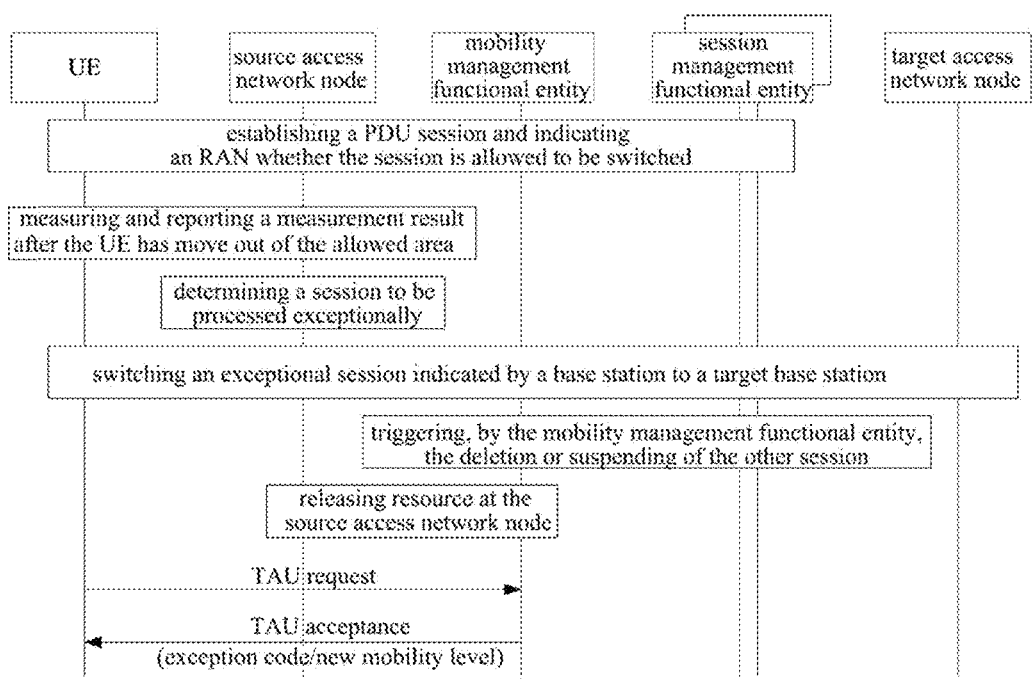
FIG. 5 is yet another illustrative schematic view showing the session management method according to one embodiment of the present disclosure.

In yet another example, as shown in FIG. 5, which is yet another illustrative schematic view showing the session management method according to one embodiment of the present disclosure, during establishment of the sessions for the UE in the allowed area, when each session is being established, the mobility management functional entity or the session management functional entity may indicate an access network node whether the session is allowed to be switched. The mobility management functional entity or the session management functional entity may indicate the access network node whether the session is allowed to be switched in accordance with a priority level of the session. For example, when a session is a high-priority service and/or a user experience-sensitive service (e.g., a voice service), the mobility management functional entity or the session management functional entity may indicate the access network node that the session is allowed to be switched. On the contrary, when a session is not a high-priority service and/or a user experience-sensitive service, the mobility management functional entity or the session management functional entity may indicate the access network node that the session is not allowed to be switched.

As shown in FIG. 5, when the UE has moved out of the allowed area, the UE may transmit a report to a source access network node, and the source access network node may trigger a switching process when it determines that the UE has moved out of the allowed area. To be specific, the source access network node may determine the session allowed to be switched and a target access network node, and transmit a switching request for switching the session allowed to be switched to the target access network node to the mobility management functional entity. The mobility management functional entity may determine the management message for switching the session allowed to be switched to the target access network node in accordance with the switching request. The session management functional entity may switch the session allowed to be switched to the target access network node in accordance with the management message, so as to complete the switching of the session. In the embodiments of the present disclosure, the switching, by the session management functional entity, the session to the target access network node may include updating the user plane transmission path for the session to the target access network node, i.e., switching the session between the source access network node and the user plane functional entity to be between target access network node and the user plane functional entity.

Figure 6:
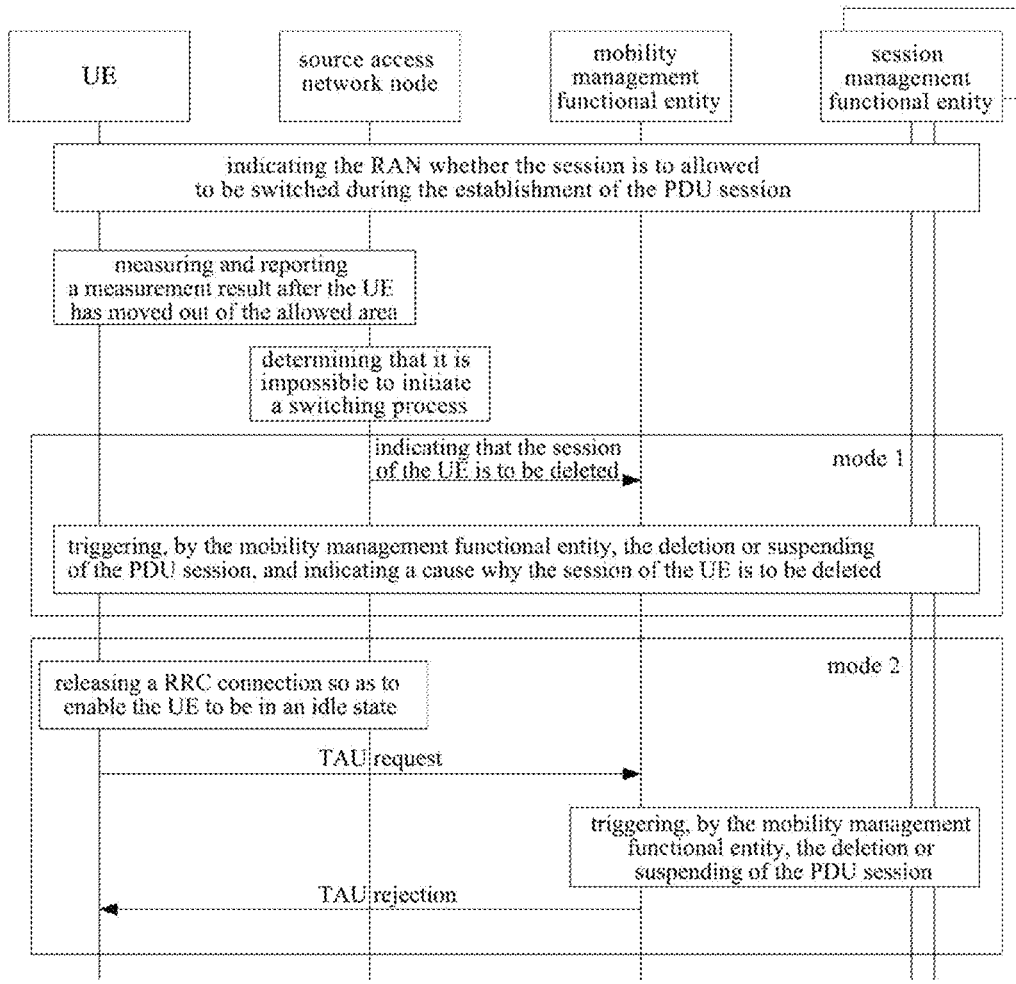
FIG. 6 is still another illustrative schematic view showing the session management method according to one embodiment of the present disclosure.

With respect to the sessions for the UE which are not allowed to be switched, the mobility management functional entity may trigger a deletion or suspending process. In still another example, as shown in FIG. 6, in mode 1, the mobility management functional entity may directly trigger a PDU deletion or suspending process. In mode 2, after the transmission of the switching request to the mobility management functional entity, the source access network node may release a Radio Resource Control (RRC) connection, so as to enable the UE to be in an idle state. Then, the UE may initiate a TAU request to the mobility management functional entity via a new access network node. Upon the receipt of the TAU request, the mobility management functional entity may trigger the session deletion or suspending process. The description about the triggering of the session deletion or suspending process by the mobility management functional entity may be the same as that in FIG. 3, and thus will not be repeated herein.

In a possible embodiment of the present disclosure, subsequent to transmitting, by the mobility management functional entity, the management message to the session management functional entity for serving the UE, the session management method may further include: receiving, by the mobility management functional entity, management confirmation information from the session management functional entity; and transmitting, by the mobility management functional entity, feedback information to the UE in accordance with the management confirmation information.

In the embodiments of the present disclosure, after managing the session of the UE in accordance with the management message transmitted from the mobility management functional entity, the session management functional entity may transmit management confirmation information, e.g., the session deletion response/session deletion confirmation information in FIG. 3, or the session update response in FIG. 4, to the mobility management functional entity. The mobility management functional entity may transmit the feedback information to the UE in accordance with the management confirmation information. For example, as shown in FIG. 3, the mobility management functional entity may transmit a TAU rejection message to the UE, so as to indicate the UE of why the UE is incapable of acquiring the network service continuously or why the session is to be deleted (e.g., the UE is out of service). As shown in FIG. 4, the mobility management functional entity may feedback a TAU acceptance message to the UE, and updates a Tracking Area (TA) list allowed for the UE. The TA list may include information of a new mobility level for the UE. In the embodiments of the present disclosure, the TA list may implicitly indicate the information of the new mobility level for the UE. As shown in FIG. 5, the mobility management functional entity may transmit the TAU acceptance message to the UE so as to indicate the information of the new mobility level for the UE, or a cause code (e.g., an exception code) may be carried in the TAU acceptance message so as to indicate that the UE is incapable of initiating a service without a high priority level.

In a possible embodiment of the present disclosure, the network service may include a session connection between the UE and a network.

In the embodiments of the present disclosure, the network service may at least include the session connection between the UE and the network. Of course, it may also include any other connection between the UE and the network, which will not be particularly defined herein.

In a possible embodiment of the present disclosure, the mobility management functional entity and the session management functional entity may be arranged in a same control plane management functional entity.

The mobility management functional entity and the session management functional entity may be arranged in a same network entity or different network entities. In the embodiments of the present disclosure, the mobility management functional entity and the session management functional entity may be arranged in a same control plane management functional entity.

In a possible embodiment of the present disclosure, the judging, by the mobility management functional entity, whether the UE has moved out of the allowed area may include judging, by the mobility management functional entity, whether the UE has moved out of the allowed area in accordance with a position report about the UE or information reported by a base station.

In the embodiments of the present disclosure, the mobility management functional entity may configure the allowed area in which the UE is allowed to acquire the network service for the UE in advance, acquire position information of the UE in accordance with the position report about the UE or the information reported by the base station to which the UE is connected, and then judge whether the UE has moved out of the allowed area in accordance with the position information of the UE.

According to the embodiments of the present disclosure, the mobility management functional entity may judge whether the UE has moved out of the allowed area, determine the management message for the session of the UE if the UE has moved out of the allowed area, and transmit the management message to the session management functional entity for serving the UE. The management message may be adopted to trigger the session management functional entity to manage the session of the UE. As a result, it is able to delete, switch or update the session of the UE in time when the UE has moved out of the allowed area, and prevent the date from being issued unnecessarily, thereby a waste of connection resources can be reduced.

Figure 7:
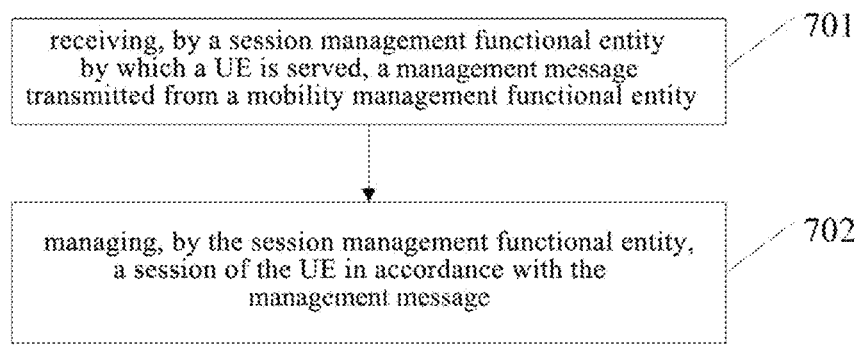
FIG. 7 is a schematic flow chart of another session management method according to one embodiment of the present disclosure.

As shown in FIG. 7, the present disclosure further provides another session management method which includes: Step 701 of receiving, by a session management functional entity for serving a UE, a management message transmitted from a mobility management functional entity; and Step 702 of managing, by the session management functional entity, a session of the UE in accordance with the management message.

In a possible embodiment of the present disclosure, the management message transmitted from the mobility management functional entity may include one or more of a management message for deleting the entire session of the UE or a user plane of the session, a management message for updating the session of the UE, and a management message for switching the session of the UE to a target access network node.

In a possible embodiment of the present disclosure, the managing, by the session management functional entity, the session of the UE in accordance with the management message may include updating, by the session management functional entity, a user plane transmission path for the session in accordance with the management message for updating the session of the UE.

In a possible embodiment of the present disclosure, the updating, by the session management functional entity, the user plane transmission path for the session in accordance with the management message for updating the session of the UE may include updating, by the session management functional entity, the user plane transmission path for the session in accordance with the management message for updating the session of the UE and an APN of a PDU.

In a possible embodiment of the present disclosure, the managing, by the session management functional entity, the session of the UE in accordance with the management message may include switching, by the session management functional entity, the user plane transmission path for the session to the target access network node in accordance with the management message for switching the session of the UE to the target access network node.

In a possible embodiment of the present disclosure, the managing, by the session management functional entity, the session of the UE in accordance with the management message may include: starting a timer by the session management functional entity; and managing, by the session management functional entity, the session of the UE in accordance with the management message after the timer is timed out.

In a possible embodiment of the present disclosure, prior to starting, by the session management functional entity, the session management method may further include judging, by the session management functional entity, whether it is necessary to start the timer in accordance with an APN of the session. The starting the timer by the session management functional entity may include, when it is determined by the session management functional entity, starting the timer by the session management functional entity.

In a possible embodiment of the present disclosure, subsequent to managing, by the session management functional entity, the session of the UE in accordance with the management message, the session management method may further include transmitting, by the session management functional entity, management confirmation information to the mobility management functional entity.

In a possible embodiment of the present disclosure, the session management functional entity and the mobility management functional entity may be arranged in a same control plane management functional entity.

It should be appreciated that, the implementation of the session management method for use in the session management functional entity may refer to the relevant description in FIG. 2, and thus will not be repeated herein.

Figure 8:
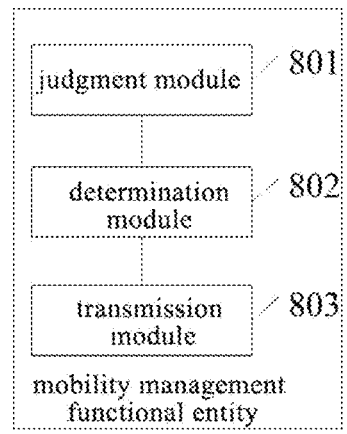
FIG. 8 is a schematic structural view showing a mobility management functional entity according to one embodiment of the present disclosure.

As shown in FIG. 8, the present disclosure further provides a mobility management functional entity which includes: a judgment module 801 configured to judge whether a UE has moved out of an allowed area; a determination module 802 configured to, when the UE has moved out of the allowed area, determine a management message for a session of the UE; and a transmission module 803 configured to transmit the management message to a session management functional entity for serving the UE. The management message is adopted to trigger the session management functional entity to manage the session of the UE.

Figure 9:
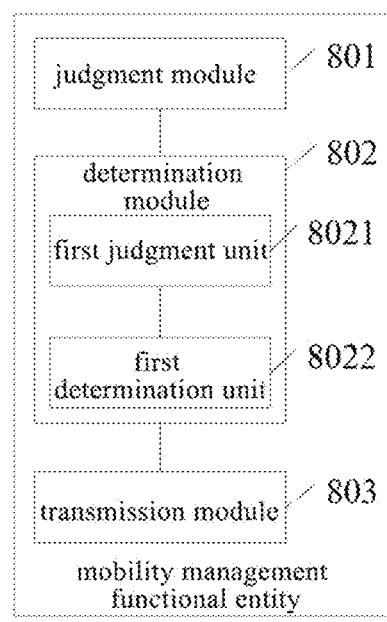
FIG. 9 is another schematic structural view showing the mobility management functional entity according to one embodiment of the present disclosure.

In a possible embodiment of the present disclosure, as shown in FIG. 9, the determination module 802 may include: a first judgment unit 8021 configured to judge whether the UE is capable of acquiring a network service continuously; and a first determination unit 8022 configured to, when the UE is incapable of acquiring the network service continuously, determine a management message for deleting the entire session of the UE or a user plane of the session.

Figure 10:
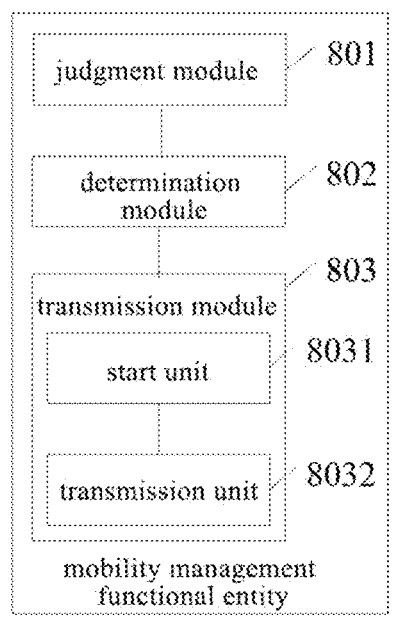
FIG. 10 is yet another schematic structural view showing the mobility management functional entity according to one embodiment of the present disclosure.

In a possible embodiment of the present disclosure, as shown in FIG. 10, the transmission module 803 may include: a start unit 8031 configured to start a timer; and a transmission unit 8032 configured to transmit the management message to the session management functional entity for serving the UE after the timer is timed out.

Figure 11:
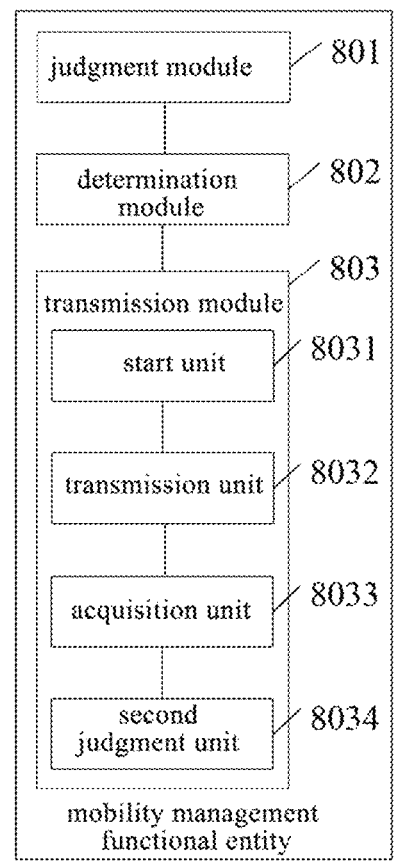
FIG. 11 is still another schematic structural view showing the mobility management functional entity according to one embodiment of the present disclosure.

In a possible embodiment of the present disclosure, as shown in FIG. 11, the transmission module 803 may further include: an acquisition unit 8033 configured to acquire mobility information of the UE; and a second judgement unit 8034 configured to judge whether it is possible for the UE to move back to the allowed area in accordance with the mobility information of the UE. The start unit 8031 is further configured to, when it is possible for the UE to move back to the allowed area, start the timer.

Figure 12:
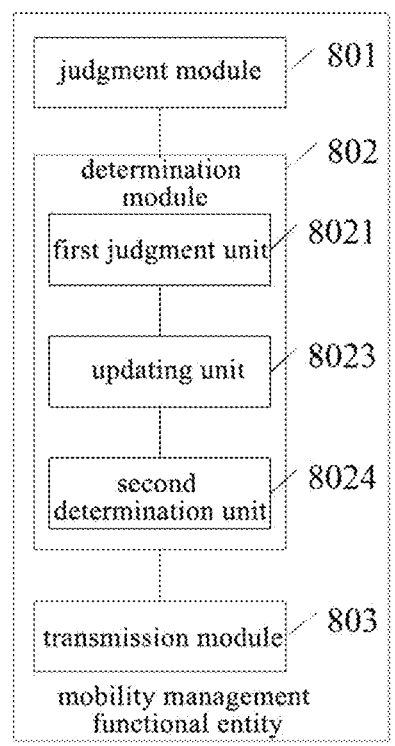
FIG. 12 is still another schematic structural view showing the mobility management functional entity according to one embodiment of the present disclosure.

In a possible embodiment of the present disclosure, as shown in FIG. 12, the determination module 802 may further include: an updating unit 8023 configured to, when the UE is capable of acquiring the network service continuously, update a mobility level for the UE; and/or a second determination unit 8024 configured to determine a management message for updating the session of the UE. The management message for updating the session of the UE may be adopted to trigger the session management functional entity to update a user plane transmission path for the session.

Figure 13:
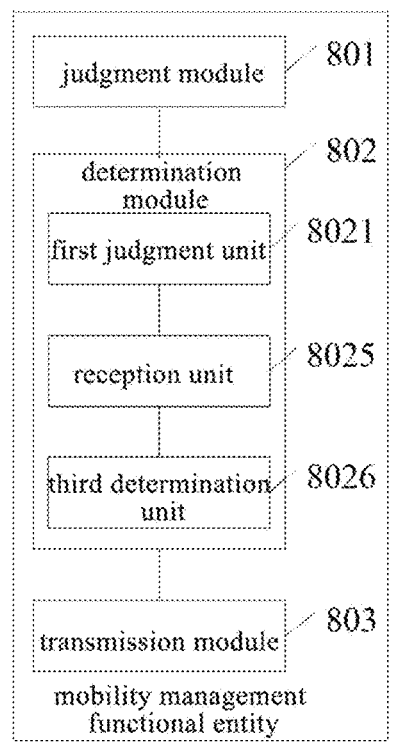
FIG. 13 is still another schematic structural view showing the mobility management functional entity according to one embodiment of the present disclosure.

In a possible embodiment of the present disclosure, as shown in FIG. 13, the determination module 802 may further include: a reception unit 8025 configured to, when the UE is capable of acquiring the network service continuously, receive a switching request transmitted from an access network node for switching the session to a target access network node; and a third determination unit 8026 configured to determine a management message for switching the session to the target access network node.

Figure 14:
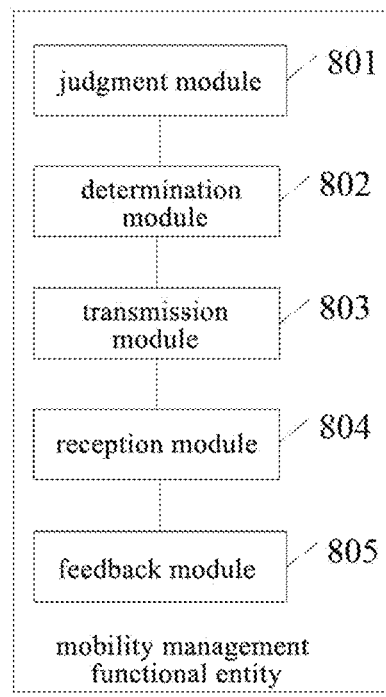
FIG. 14 is still another schematic structural view showing the mobility management functional entity according to one embodiment of the present disclosure.

In a possible embodiment of the present disclosure, as shown in FIG. 14, the mobility management functional entity may further include: a reception module 804 configured to receive management confirmation information from the session management functional entity; and a feedback module 805 configured to transmit feedback information to the UE in accordance with the management confirmation information.

In a possible embodiment of the present disclosure, the network service may include a session connection between the UE and a network.

In a possible embodiment of the present disclosure, the mobility management functional entity and the session management functional entity may be arranged in a same control plane management functional entity.

In a possible embodiment of the present disclosure, the judgment module 801 is further configured to judge whether the UE has moved out of the allowed area in accordance with a position report about the UE or information reported by a base station.

It should be appreciated that, the implementation of the mobility management functional entity may refer to that shown in FIGS. 1-7 with a same beneficial effect, and thus will not be particularly defined herein.

Figure 15:
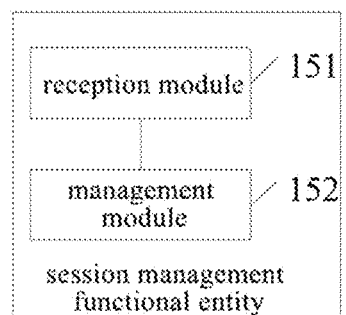
FIG. 15 is a schematic structural view showing a session management functional entity according to one embodiment of the present disclosure.

As shown in FIG. 15, the present disclosure further provides in some embodiments a session management functional entity which includes: a reception module 151 configured to receive a management message transmitted from a mobility management functional entity; and a management module 152 configured to manage a session of the UE in accordance with the management message.

In a possible embodiment of the present disclosure, the management message transmitted from the mobility management functional entity may include one or more of a management message for deleting the entire session of the UE or a user plane of the session, a management message for updating the session of the UE, and a management message for switching the session of the UE to a target access network node.

In a possible embodiment of the present disclosure, the management module 152 is further configured to update a user plane transmission path for the session in accordance with the management message for updating the session of the UE.

In a possible embodiment of the present disclosure, the management module 152 is further configured to update the user plane transmission path for the session in accordance with the management message for updating the session of the UE and an APN of a PDU.

In a possible embodiment of the present disclosure, the management module 152 is further configured to switch the user plane transmission path for the session to the target access network node in accordance with the management message for switching the session of the UE to the target access network node.

Figure 16:
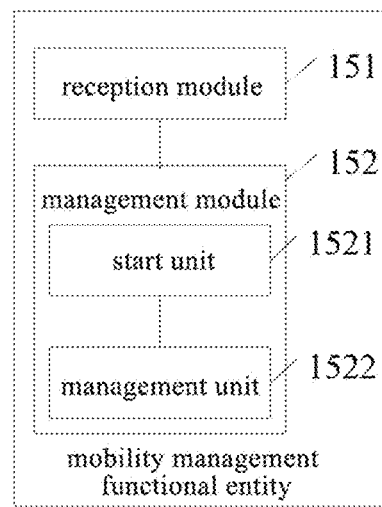
FIG. 16 is another schematic structural view showing the session management functional entity according to one embodiment of the present disclosure.

In a possible embodiment of the present disclosure, as shown in FIG. 16, the management module 152 may include: a start unit 1521 configured to start a timer; and a management unit 1522 configured to manage the session of the UE in accordance with the management message after the timer is timed out.

Figure 17:
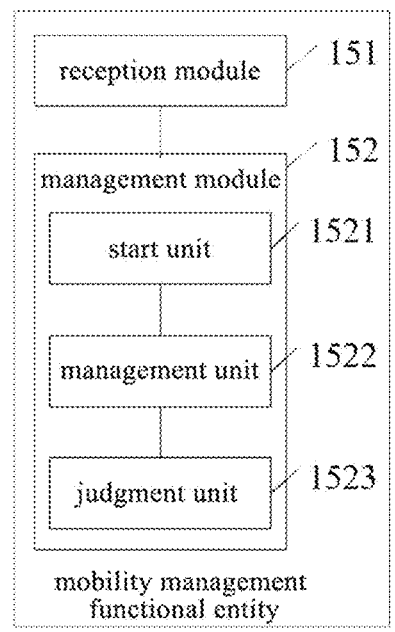
FIG. 17 is yet another schematic structural view showing the session management functional entity according to one embodiment of the present disclosure.

In a possible embodiment of the present disclosure, as shown in FIG. 17, the management module 152 may further include a judgment unit 1523 configured to judge whether it is necessary to start the timer in accordance with an APN of the session. The management unit 1522 is further configured to, when it is determined by the session management functional entity, start the timer by the session management functional entity.

Figure 18:
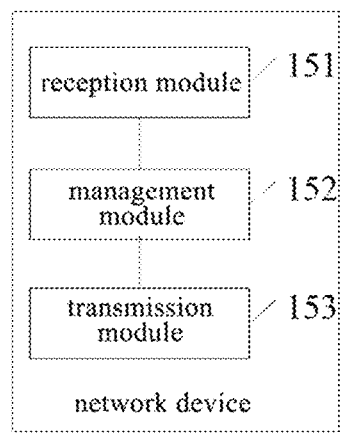
FIG. 18 is still another schematic structural view showing the session management functional entity according to one embodiment of the present disclosure.

In a possible embodiment of the present disclosure, as shown in FIG. 18, the session management functional entity may further include a transmission unit 153 configured to transmit management confirmation information to the mobility management functional entity.

In a possible embodiment of the present disclosure, the session management functional entity and the mobility management functional entity may be arranged in a same control plane management functional entity.

It should be appreciated that, the implementation of the session management functional entity may refer to that shown in FIGS. 1-7 with a same beneficial effect, and thus will not be particularly defined herein.

Figure 19:
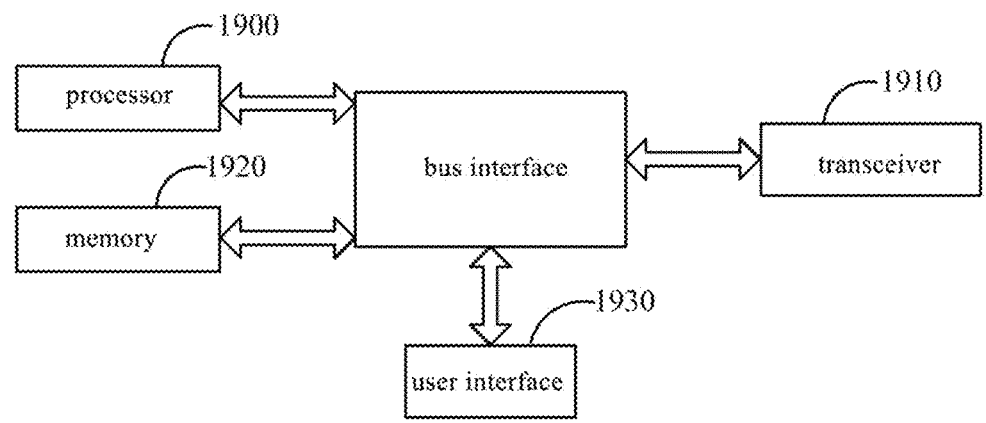
FIG. 19 is still another schematic structural view showing the session management functional entity according to one embodiment of the present disclosure.

As shown in FIG. 19, the present disclosure further provides in some embodiments a mobility management functional entity which includes a processor 1900, a transceiver 1919, a memory 1920, a user interface 1930, and a bus interface. The processor 1900 is configured to read a program stored in the memory 1920, so as to: judge whether a UE has moved out of an allowed area; when the UE has moved out of the allowed area, determine a management message for a session of the UE; and transmit the management message to a session management functional entity for serving the UE. The management message is adopted to trigger the session management functional entity to manage the session of the UE. The transceiver 1919 is configured to receive and transmit data under the control of the processor 1900.

In FIG. 19, the bus architecture may include any number of interconnected buses and bridges, so as to connect various circuits including for example one or more processors represented by the processor 1900 and one or more memories represented by the memory 1920. In addition, as is known in the art, the bus architecture may be used to connect other circuits such as peripheral device, voltage regulator and power management circuit. The bus interface may be provided, and the transceiver 1919 may consist of a plurality of elements, i.e., a transmitter and a receiver for communication with any other devices over a transmission medium. With respect to different UEs, the user interface 1930 may also be provided for devices which are to be arranged inside or outside the UE, and these devices may include but not limited to a keypad, a display, a speaker, a microphone and a joystick.

The processor 1900 may take charge of managing the bus architecture as well as general processing. The memory 1920 may store therein data for the operation of the processor 1900.

In a possible embodiment of the present disclosure, the processor 1900 is further configured to: judge whether the UE is capable of acquiring a network service continuously; and when the UE is incapable of acquiring the network service continuously, determine a management message for deleting the session of the UE.

In a possible embodiment of the present disclosure, the processor 1900 is further configured to: start a timer; and transmit the management message to the session management functional entity for serving the UE after the timer is timed out.

In a possible embodiment of the present disclosure, prior to starting the timer, the processor 1900 is further configured to: acquire mobility information of the UE; and judge whether it is possible for the UE to move back to the allowed area in accordance with the mobility information of the UE.

In addition, the processor 1900 is further configured to, if it is possible for the UE to move back to the allowed area, start the timer.

In a possible embodiment of the present disclosure, subsequent to judging whether the UE is capable of acquiring the network service continuously, the processor 1900 is further configured to: if the UE is capable of acquiring the network service continuously, update a mobility level for the UE; and/or determine a management message for updating the session of the UE. The management message for updating the session of the UE may be adopted to trigger the session management functional entity to update a user plane transmission path for the session.

In a possible embodiment of the present disclosure, subsequent to determining whether the UE is capable of acquiring the network service continuously, the processor 1900 is further configured to: when the UE is capable of acquiring the network service continuously, receive a switching request transmitted from an access network node for switching the session to a target access network node; and determine a management message for switching the session to the target access network node.

In a possible embodiment of the present disclosure, subsequent to transmitting the management message to the session management functional entity for serving the UE, the processor 1900 is further configured to: receive management confirmation information from the session management functional entity; and transmit feedback information to the UE in accordance with the management confirmation information.

In a possible embodiment of the present disclosure, the network service may include a session connection between the UE and a network.

In a possible embodiment of the present disclosure, the mobility management functional entity and the session management functional entity may be arranged in a same control plane management functional entity.

In a possible embodiment of the present disclosure, the processor 1900 is further configured to judge whether the UE has moved out of the allowed area in accordance with a position report about the UE or information reported by a base station.

It should be appreciated that, the implementation of the mobility management functional entity may refer to that of the method in FIGS. 1-7 with a same beneficial effect, and thus will not be particularly defined herein.

Figure 20:
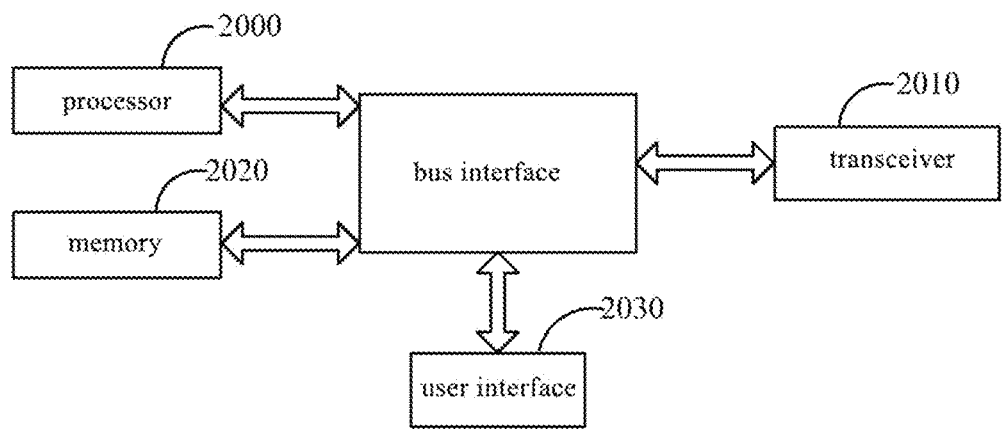
FIG. 20 is still another schematic structural view showing the session management functional entity according to one embodiment of the present disclosure.

As shown in FIG. 20, the present disclosure further provides in some embodiments a session management functional entity which includes a processor 2000, a transceiver 2010, a memory 2020, a user interface 2030 and a bus interface. The processor 2000 is configured to read a program stored in the memory 2020, so as to: receive a management message transmitted from a mobility management functional entity; and manage a session of the UE in accordance with the management message. The transceiver 2010 is configured to receive and transmit data under the control of the processor 2000.

In FIG. 20, bus architecture may include a number of buses and bridges connected to each other, so as to connect various circuits for one or more processors 2000 and one or more memories 2020. In addition, as is known in the art, the bus architecture may be used to connect any other circuits, such as peripheral device, voltage regulator and power management circuit. The bus interface may be provided, and the transceiver 2010 may consist of a plurality of elements, i.e., a transmitter and a receiver for communication with any other devices over a transmission medium. The processor 2000 may take charge of managing the bus architecture as well as general processings. The memory 2020 may store therein data for the operation of the processor 2000.

In a possible embodiment of the present disclosure, the management message transmitted from the mobility management functional entity may include one or more of a management message for deleting the entire session of the UE or a user plane of the session, a management message for updating the session of the UE, and a management message for switching the session of the UE to a target access network node.

In a possible embodiment of the present disclosure, the processor 2000 is further configured to update a user plane transmission path for the session in accordance with the management message for updating the session of the UE.

In a possible embodiment of the present disclosure, the processor 2000 is further configured to update the user plane transmission path for the session in accordance with the management message for updating the session of the UE and an APN of a PDU.

In a possible embodiment of the present disclosure, the processor 2000 is further configured to switch the user plane transmission path for the session to the target access network node in accordance with the management message for switching the session of the UE to the target access network node.

In a possible embodiment of the present disclosure, the processor 2000 is further configured to: start a timer; and manage the session of the UE in accordance with the management message after the timer is timed out.

In a possible embodiment of the present disclosure, prior to starting the timer, the processor 2000 is further configured to judge whether it is necessary to start the timer in accordance with an APN of the session. In addition, the processor 2000 is further configured to, when it is determined by the session management functional entity, start the timer by the session management functional entity.

In a possible embodiment of the present disclosure, subsequent to managing the session of the UE in accordance with the management message, the processor 2000 is further configured to transmit management confirmation information to the mobility management functional entity.

In a possible embodiment of the present disclosure, the session management functional entity and the mobility management functional entity may be arranged in a same control plane management functional entity.

It should be appreciated that, the implementation of the session management functional entity may refer to that of the method in FIGS. 1-7 with a same beneficial effect, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A session management method, performed by a mobility management functional entity, comprising:
   judging, by the mobility management functional entity, whether a User Equipment (UE) has moved out of an allowed area;
   when the UE has moved out of the allowed area, determining, by the mobility management functional entity, a management message for a session of the UE; and
   transmitting, by the mobility management functional entity, the management message to a session management functional entity for serving the UE, wherein the management message is adopted to trigger the session management functional entity to manage the session of the UE;
   wherein the determining, by the mobility management functional entity, the management message for the session of the UE comprises:
   judging, by the mobility management functional entity, that the UE is incapable of acquiring a network service continuously; and
   determining, by the mobility management functional entity, a management message for deleting the entire session of the UE or a user plane of the session by the session management functional entity.

2. The session management method according to claim 1, wherein the transmitting, by the mobility management functional entity, the management message to the session management functional entity for serving the UE comprises:
   starting a timer by the mobility management functional entity; and
   transmitting, by the mobility management functional entity, the management message to the session management functional entity for serving the UE after the timer is timed out.

3. The session management method according to claim 1, wherein prior to starting the timer by the mobility management functional entity, the session management method further comprises:
   acquiring, by the mobility management functional entity, mobility information of the UE; and
   judging, by the mobility management functional entity, whether it is possible for the UE to move back to the allowed area in accordance with the mobility information of the UE,
   wherein the starting the timer by the mobility management functional entity comprises, when it is possible for the UE to move back to the allowed area, starting the timer by the mobility management functional entity.

4. The session management method according to claim 1, wherein subsequent to transmitting, by the mobility management functional entity, the management message to the session management functional entity for serving the UE, the session management method further comprises:
   receiving, by the mobility management functional entity, management confirmation information transmitted from the session management functional entity; and
   transmitting, by the mobility management functional entity, feedback information to the UE in accordance with the management confirmation information.

5. The session management method according to claim 1, wherein the network service comprises a session connection between the UE and a network.

6. The session management method according to claim 1, wherein the mobility management functional entity and the session management functional entity are arranged in a same control plane management functional entity.

7. The session management method according to claim 1, wherein the judging, by the mobility management functional entity, whether the UE has moved out of the allowed area comprises:
   judging, by the mobility management functional entity, whether the UE has moved out of the allowed area in accordance with a position report about the UE or information reported by a base station.

8. A session management method, performed by a session management functional entity, comprising:
   receiving, by the session management functional entity for serving a UE, a management message transmitted from a mobility management functional entity when the UE is incapable of acquiring a network service continuously; and
   managing, by the session management functional entity, a session of the UE in accordance with the management message;
   transmitting, by the session management functional entity, management confirmation information to the mobility management functional entity;
   wherein managing the session of the UE in accordance with the management message comprising:
   deleting the entire session of the UE or a user plane of the session according to the management message for deleting the entire session of the UE or the user plane of the session by the session management functional entity.

9. The session management method according to claim 8, wherein the management message transmitted from the mobility management functional entity further comprises a management message for updating the session of the UE, or a management message for switching the session of the UE to a target access network node.

10. The session management method according to claim 9, wherein the managing, by the session management functional entity, the session of the UE in accordance with the management message comprises:
  updating, by the session management functional entity, a user plane transmission path for the session in accordance with the management message for updating the session of the UE.

11. The session management method according to claim 10, wherein the updating, by the session management functional entity, the user plane transmission path for the session in accordance with the management message for updating the session of the UE comprises:
  updating, by the session management functional entity, the user plane transmission path for the session in accordance with the management message for updating the session of the UE and an Access Point Name (APN) of a Protocol Data Unit (PDU).

12. The session management method according to claim 9, wherein the managing, by the session management functional entity, the session of the UE in accordance with the management message comprises:
  switching, by the session management functional entity, the user plane transmission path for the session to the target access network node in accordance with the management message for switching the session of the UE to the target access network node.

13. The session management method according to claim 8, wherein the managing, by the session management functional entity, the session of the UE in accordance with the management message comprises:
  starting a timer by the session management functional entity; and
  managing, by the session management functional entity, the session of the UE in accordance with the management message after the timer is timed out.

14. The session management method according to claim 13, wherein prior to starting the timer by the session management functional entity, the session management method further comprises judging, by the session management functional entity, whether it is necessary to start the timer in accordance with an APN of the session, wherein the starting the timer by the session management functional entity comprises,
  when it is determined by the session management functional entity, starting the timer by the session management functional entity.

15. The session management method according to claim 8, wherein the session management functional entity and the mobility management functional entity are arranged in a same control plane management functional entity.

16. A mobility management functional entity, comprising a processor, a memory and a transceiver,
  wherein the processor is configured to read and execute a program stored in the memory, so as to implement a session management method, the session management method comprises:
  judging, by the mobility management functional entity, whether a User Equipment (UE) has moved out of an allowed area;
  when the UE has moved out of the allowed area, determining, by the mobility management functional entity, a management message for a session of the UE; and
  transmitting, by the mobility management functional entity, the management message to a session management functional entity for serving the UE, wherein the management message is adopted to trigger the session management functional entity to manage the session of the UE;
  wherein the determining, by the mobility management functional entity, the management message for the session of the UE comprises:
  judging, by the mobility management functional entity, the UE is incapable of acquiring a network service continuously; and
  determining, by the mobility management functional entity, a management message for deleting the entire session of the UE or a user plane of the session by the session management functional entity;
  wherein the transceiver is configured to receive and transmit data, and the memory is configured to store therein data for the operation of the processor.

17. A session management functional entity, comprising a processor, a memory and a transceiver,
  wherein the processor is configured to read and execute a program stored in the memory, so as to implement the session management method of claim 8,
  wherein the transceiver is configured to receive and transmit data, and the memory is configured to store therein data for the operation of the processor.

18. The mobility management functional entity according to claim 16, wherein the transmitting, by the mobility management functional entity, the management message to the session management functional entity for serving the UE comprises:
  starting a timer by the mobility management functional entity; and
  transmitting, by the mobility management functional entity, the management message to the session management functional entity for serving the UE after the timer is timed out.

19. The mobility management functional entity according to claim 16, wherein the processor is further configured to:
  acquire the mobility information of the UE; and
  judge whether it is possible for the UE to move back to the allowed area in accordance with the mobility information of the UE,
  wherein the starting the timer by the mobility management functional entity comprises, when it is possible for the UE to move back to the allowed area, starting the timer by the mobility management functional entity.

* * * * *